E. Q. MOSES.
VEHICLE SEAT.
APPLICATION FILED OCT. 25, 1917.

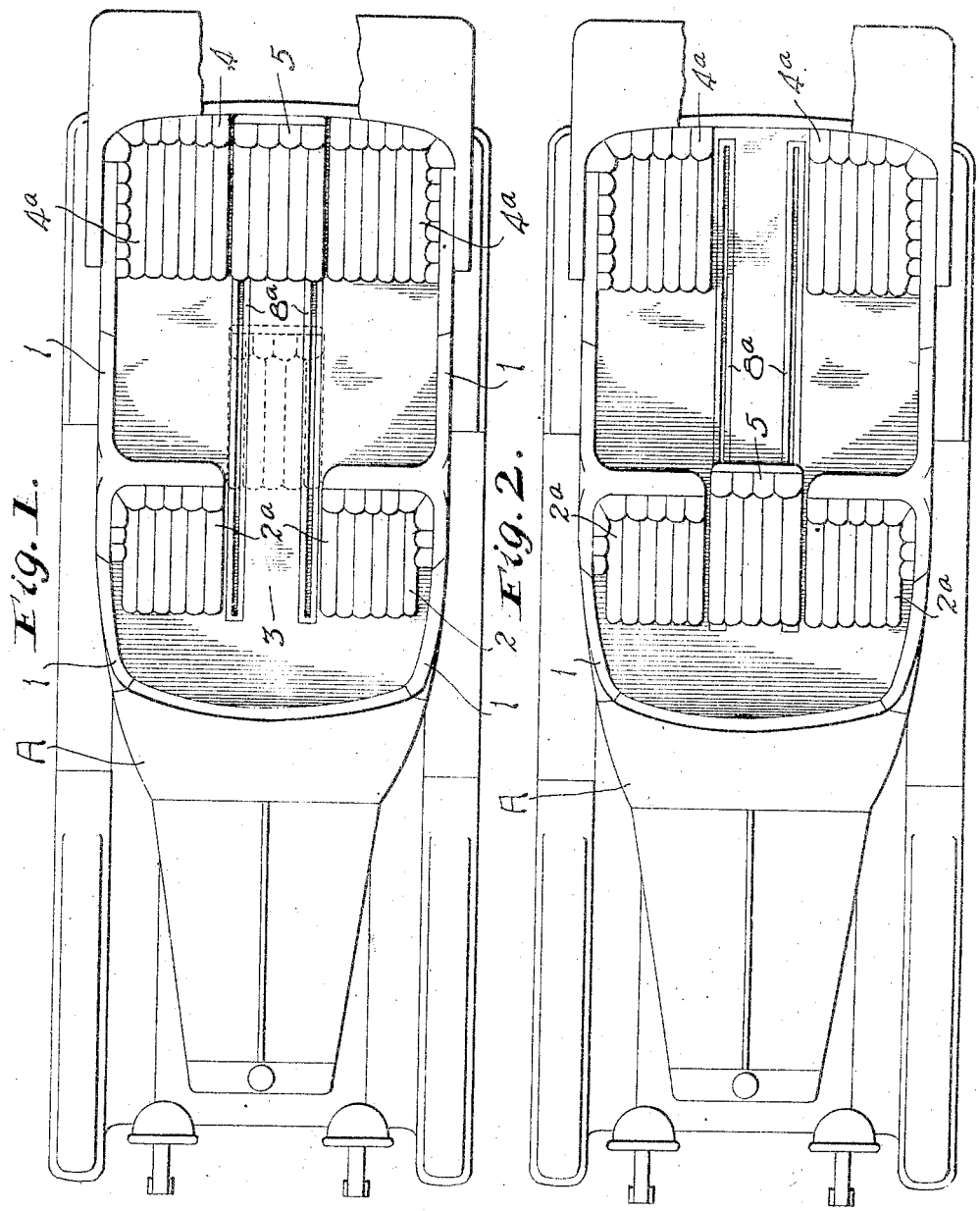

1,306,498.

Patented June 10, 1919.

Edmund Quincy Moses
Inventor

UNITED STATES PATENT OFFICE.

EDMUND QUINCY MOSES, OF NEW YORK, N. Y., ASSIGNOR OF ONE-HALF TO WILLIAM P. HAMMOND, OF PASSAIC, NEW JERSEY.

VEHICLE-SEAT.

1,306,498.      Specification of Letters Patent.      Patented June 10, 1919.

Application filed October 25, 1917. Serial No. 198,377.

*To all whom it may concern:*

Be it known that I, EDMUND QUINCY MOSES, a citizen of the United States, residing in New York, county of New York, and State of New York, have invented certain new and useful Improvements in Vehicle-Seats, of which the following is a specification.

The present invention relates to new and useful improvements in the construction and arrangement of seats for passenger carrying road vehicles especially applicable to automobiles. The principal object of the invention is to provide a seat construction adapted to conveniently accommodate two or more passengers. In vehicles intended to carry more than two persons, it is customary to provide a driver's seat and a seat in rear thereof adapted to accommodate a plurality of passengers, one or more of whom may be to a certain extent isolated from the driver's seat and not within convenient distance for conversation. For instance, in a five passenger automobile where there are seats for two persons in front, and three persons in rear, if the automobile is occupied by only three persons, the third person will be obliged to utilize the conventional rear seat of the automobile by himself. The present invention, therefore, provides seating means for an occupant adapted to be brought into proximity to the driver's seat thereby affording an opportunity for sociability and conversation. The invention is equally applicable to all seating arrangements where analogous conditions may arise.

Another object of the invention is to provide a body and seat construction of the class described which is comparatively simple and inexpensive, and which in no way detracts from the appearance or seating space of the automobile.

For a full understanding of the invention, reference is to be had to the following description and accompanying drawings, in which:—

Figure 1 is a top plan view of an automobile body showing a seat construction embodying one form of the present invention, the movable portion of the rear seat being shown in its normal position by solid lines, and in one of its intermediate positions by dotted lines.

Fig. 2 is a similar view showing the movable portion of the rear seat moved forwardly into the aisle between the front seats.

Corresponding and like parts are referred to in the following description and indicated in all the views of the drawings by the same reference characters.

Figure 3:
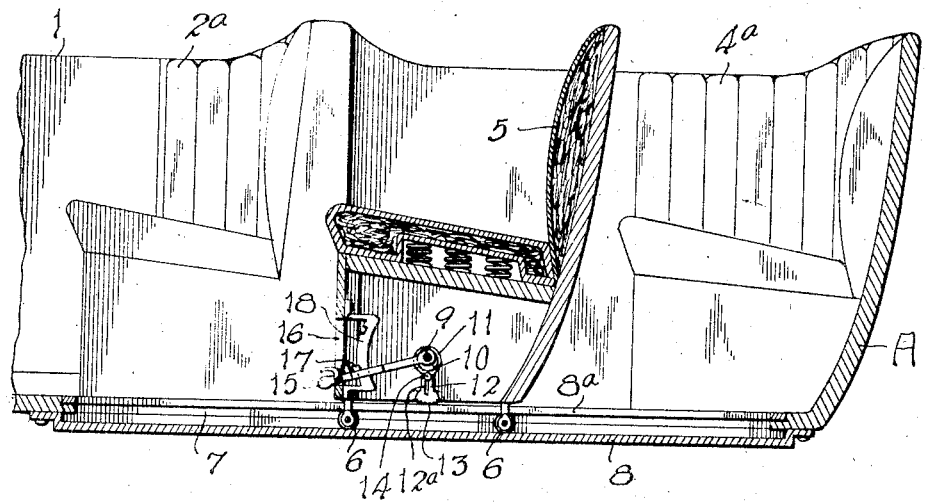
Fig. 3 is an enlarged longitudinal sectional view through the rear portion of the automobile body.

Specifically describing the embodiment of the invention illustrated by Figs. 1 to 4 inclusive, the reference character A designates the body of the vehicle which is of the conventional design, being provided with the usual doors 1 for passage to and from the vehicle body. The front seat 2 of the vehicle is divided into two sections $2^a$ which are separate and laterally spaced apart to form an aisle 3 between the same for passage to and from the rear seat 4 of the vehicle. The rear seat 4 is divided into three preferably substantially equal sections, the end sections $4^a$ being rigidly and permanently formed with the vehicle body, while the central portion 5 is adapted to be moved forwardly into close proximity to the front seat 2. The aisle 3 between the sections $2^a$ of the front seat may or may not be formed large enough to receive the central section 5 of the rear seat, as is desired, although in the present instance the aisle 3 is shown as wide enough to receive the central section 5 of the rear seat so as to form substantially a continuous front seat as illustrated by Fig. 2 of the drawing. It will be noted that when the rear seat section 5 is moved into the position indicated by dotted lines on Fig. 1, the aisle 3 forms adequate foot space for the occupant of the seat section 5.

Any suitable means may be provided for adapting the central section 5 of the rear seat to be moved longitudinally of the vehicle body, although in the present instance the corners of the section 5 of the rear seat are shown as provided with rollers 6 which pass through parallel slots 7 in the bottom of the vehicle body and engage longitudinal tracks 8 which are secured to the underside of the bottom of the body, slotted plates $8^a$ being arranged over the slots 7 and engaging the tops of the rollers to prevent the same from being accidentally withdrawn from engagement with the tracks 8 when moving the seat back and forth into its various positions.

Figure 4:
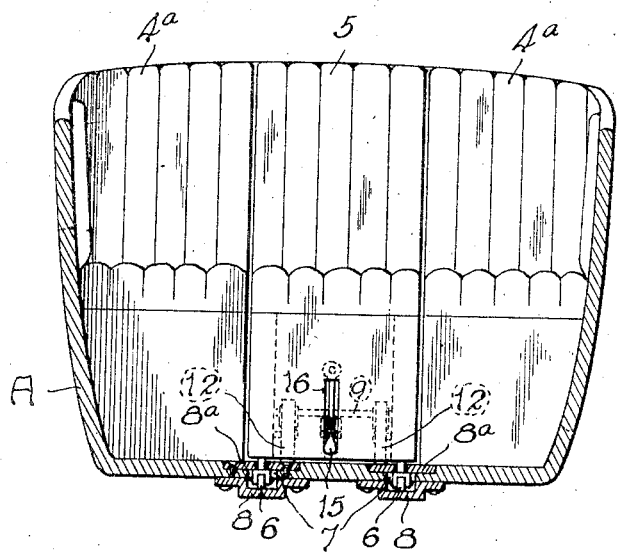
Fig. 4 is a transverse vertical sectional view through the same.

Numerous constructions can be utilized for locking the rear seat section 5 in any of the positions into which it is designed to be moved, although only one possible arrangement is shown on the drawings, this being sufficient for illustrating the principles of the invention. Referring to Figs. 3 and 4 of the drawing, the reference character 9 designates a horizontally disposed rock shaft which extends transversely across the seat section 5, the ends thereof being journaled in the sides of the said seat section. An eccentric cam 10 is rigidly secured to said rock shaft 9 near each of its ends, said cams being surrounded by eccentric straps 11 which are rigid with the upper ends of vertically disposed clamping dogs 12, the lower ends of which are of an arcuate formation and serrated at 13. Pins 14 project inwardly from the sides of the seat section 5 and engage slots 12ᵃ in the clamping dogs 12 so that the said clamping dogs may have both a sliding and a rotary movement on said pins 14. A lever 15 is rigidly applied to the rock shaft 9 at an intermediate point in the length thereof, said lever projecting through a slot 16 in the front of the seat section 5, and the outer end of said lever being provided with a conventional latch 17 adapted to engage notches in a segmental locking plate 18 secured to the inner side of the front of the seat section 5 so as to lock the lever in either its upper or lower position. The rock shaft 9 is adapted to be rotated by oscillation of the lever 15, and as the shaft rotates the cams 10 cause a vertical movement of the clamping dogs 12. When the lever and rock shaft are in the position indicated by Fig. 3, the cams 10 force the clamping dogs downwardly so that the serrated lower ends thereof bite into the slotted plates 8ᵃ which are arranged directly beneath them, and when in this position the clamping dogs 12 prevent any movement of the seat section 5 longitudinally of the vehicle body and also prevent shaking or rattling thereof, since the clamping action causes the slotted plates 8ᵃ to be tightly clamped between the rollers 6 on the seat section and the clamping dogs 12. In effect, the seat section 5 is rigidly clamped to the plates 8ᵃ. When the lever 15 is raised upwardly to the limit of its movement the clamping dogs are raised by the cams 10 so as to clear the plates 8ᵃ, thus allowing the seat section to be easily moved. With this construction it will be obvious that when four or more persons are riding in the vehicle illustrated by Figs. 1 to 4 inclusive, the central section 5 of the rear seat will be locked by the cams 10 and clamping dogs 12 in its normal position between the end sections 4ᵃ of the rear seat, while when only three persons are riding the section 5 can be moved into any position between the rear seat and front seat, such as that indicated by dotted lines on Fig. 1, or the position indicated by solid lines on Fig. 2. With the section 5 located in either of the two last mentioned positions the third person is in touch with and easy hearing distance of the driver of the vehicle and the other occupant of the front seat, so that he will not be in any manner isolated, as would be the case were he compelled to ride alone in the rear seat of the conventional touring car.

While certain preferable embodiments of the invention are illustrated to show the application of the principles of my invention, I do not wish to be limited thereto, since the invention is susceptible of numerous modifications, and it is my desire to cover broadly the principles of the invention in whatever form they may be embodied.

Having thus described the invention, what I claim as new and desire to secure by Letters Patent, is:—

1. In a vehicle of the class described, a permanent front seat, a permanent rear seat section, and a movable seat section adapted to be made a part of either of said seats.

2. In a vehicle of the class described, laterally spaced front seats, laterally spaced rear seats, and a movable seat section adapted to be moved interchangeable between either the laterally spaced front seats or the laterally spaced rear seats.

3. In a vehicle of the class described, a driver's seat, a rear seat normally spaced from said driver's seat and comprising a plurality of sections normally constituting a substantially continuous rear seat, and means for mounting one of said sections whereby it may be moved toward and away from the driver's seat.

4. In a vehicle of the class described, a driver's seat, a seat located in the rear of said driver's seat and comprising a plurality of sections each including a seat portion and a back portion, said sections normally constituting a substantially continuous rear seat, a track in the vehicle body, means for mounting one of said seat sections on said track whereby it may be moved toward or away from said front seat, and means for securing said movable seat section in adjusted position.

5. In a vehicle of the class described, two separate and laterally spaced front seats, a rear seat normally spaced from said front seat and comprising a plurality of sections, one of which is in alinement with the space between the front seats, and means whereby said section in alinement with the space between the front seats can be moved from its normal position to one adjacent said front seats.

6. In a vehicle of the class described, laterally spaced front seats, and a rear seat normally spaced from said front seat and comprising a plurality of sections, one of which can be moved into the space between said front seats.

7. In a vehicle of the class described, two separate and laterally spaced front seats, a rear seat normally spaced from said front seats and in alinement with the space between said front seats, and means for mounting said rear seat whereby it may be moved from its normal position to one adjacent said front seats.

8. In a vehicle of the class described, laterally spaced front seats, a rear seat of a width substantially equal to the space between said front seats and adapted normally to occupy a position in rear of said front seats, and means for mounting said rear seat whereby it may be moved into the space between said front seats so as to provide a substantially continuous front seat capable of seating at least three persons.

9. In a vehicle, a driver's seat, a passenger seat nearer the rear of the vehicle than the driver's seat, said passenger seat including a movable section capable of being advanced to a position at one side of the driver's seat, and means for securing said section in such advanced position.

10. In a vehicle, a seat adapted to provide accommodations for a plurality of passengers and including a movable section and a fixed section, a driver's seat located nearer the front of the vehicle than the fixed section of the passenger seat, the movable section of the passenger seat being movable from a position in substantial alinement with the fixed section of said seat to a position in substantial alinement with and at one side of the driver's seat, and means for securing said movable section in either of said positions.

EDMUND QUINCY MOSES.